United States Patent [19]

Harms

[11] Patent Number: 5,086,795

[45] Date of Patent: Feb. 11, 1992

[54] REMOVABLE FLUSHING SYSTEM FOR MACHINE TOOL COOLANT RETURN SYSTEM FLUMES

[75] Inventor: Eugene H. Harms, Perrysburg, Ohio

[73] Assignee: Henry Filters, Inc., Bowling Green, Ohio

[21] Appl. No.: 333,302

[22] Filed: Apr. 4, 1989

[51] Int. Cl.⁵ ............................................. B08B 3/02
[52] U.S. Cl. .................... 134/166 R; 239/127; 239/142; 210/154; 210/171; 134/201
[58] Field of Search .................... 366/138, 137; 134/166 R, 201; 210/154, 170, 171, 168, 416.5; 137/328; 29/DIG. 63, DIG. 102; 184/6.24; 239/142, 127, 680; 406/50, 106, 93, 85, 95; 400/94, 171; 123/196 A; 165/104.28, 108, 104.29, 119, 104.31, 120

[56] References Cited

U.S. PATENT DOCUMENTS

| | | | |
|---|---|---|---|
| 1,164,899 | 12/1915 | White | 406/93 X |
| 1,273,849 | 7/1918 | Gritanner et al. | 406/94 X |
| 1,419,143 | 6/1922 | Jones | 406/106 |
| 1,495,303 | 5/1924 | Heidelberg | 137/238 |
| 1,775,264 | 9/1930 | Allen | 406/94 |
| 1,854,907 | 4/1932 | Murray | 406/94 |
| 2,219,011 | 10/1940 | Kidwell et al. | 406/94 X |
| 2,652,737 | 9/1953 | Longstreet | 134/104.4 X |
| 3,314,679 | 4/1967 | Kolln | 406/94 X |
| 3,544,170 | 12/1970 | Bowles | 406/93 |
| 4,286,527 | 9/1981 | Robinson et al. | 406/94 X |
| 4,408,642 | 10/1983 | Jeruzal et al. | 29/DIG. 102 X |
| 4,655,940 | 4/1987 | Harms | 210/138 X |
| 4,667,351 | 5/1987 | Williams | 134/166 R X |
| 4,878,649 | 11/1989 | Baba et al. | 239/127 X |
| 4,913,819 | 4/1990 | Patterson | 134/166 R X |

FOREIGN PATENT DOCUMENTS

| | | | |
|---|---|---|---|
| 576014 | 4/1933 | Fed. Rep. of Germany | 400/94 |
| 58485 | 9/1933 | Fed. Rep. of Germany | 401/95 |
| 947554 | 1/1964 | United Kingdom | 134/104 |
| 1356589 | 6/1974 | United Kingdom | 400/94 |

*Primary Examiner*—Frankie L. Stinson
*Attorney, Agent, or Firm*—Brooks & Kushman

[57] ABSTRACT

A flushing system 10 for a machine tool coolant return system is disclosed which is readily removable for servicing or replacement. In the preferred embodiment of the invention, a flush nozzle assembly 34 is submerged beneath a normal coolant level 14 in flumes 16 and 18 to provide coolant for flushing machine waste and maintaining the flow of coolant and machine waste toward the filter. A lower member 20 is provided between flume sections 16 and 18 which is adapted to receive the flush nozzle assembly 34. A hollow elongated guide 28 is secured to the lower member 20 and has an open end 29 located for easy access. A flexible hose 32 has the flush nozzle assembly 34 attached to end 33 and is inserted into guide 28 where it is securely received in the lower member 20. The other end 35 of the flexible hose is connected to a source of coolant 46 to provide coolant to the nozzle assembly 34 and into the flumes 16 and 18. If the hose 32 or nozzle assembly 34 break or become clogged, the hose 32 and nozzle assembly 34 are readily removed from the lower member 20 for servicing or replacement.

19 Claims, 3 Drawing Sheets

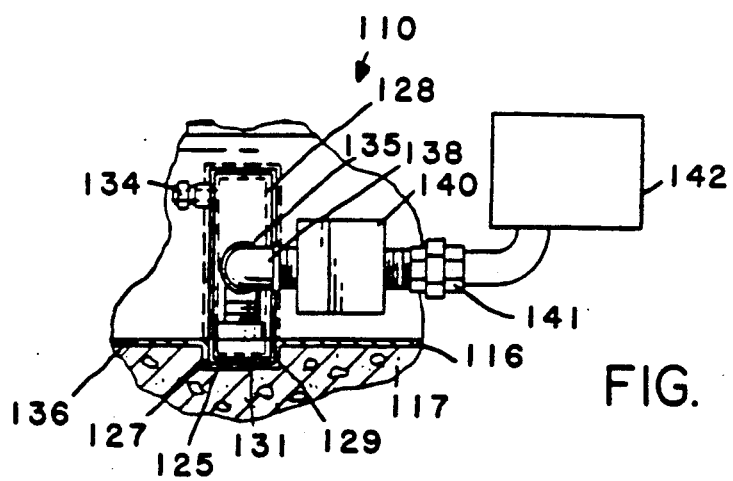
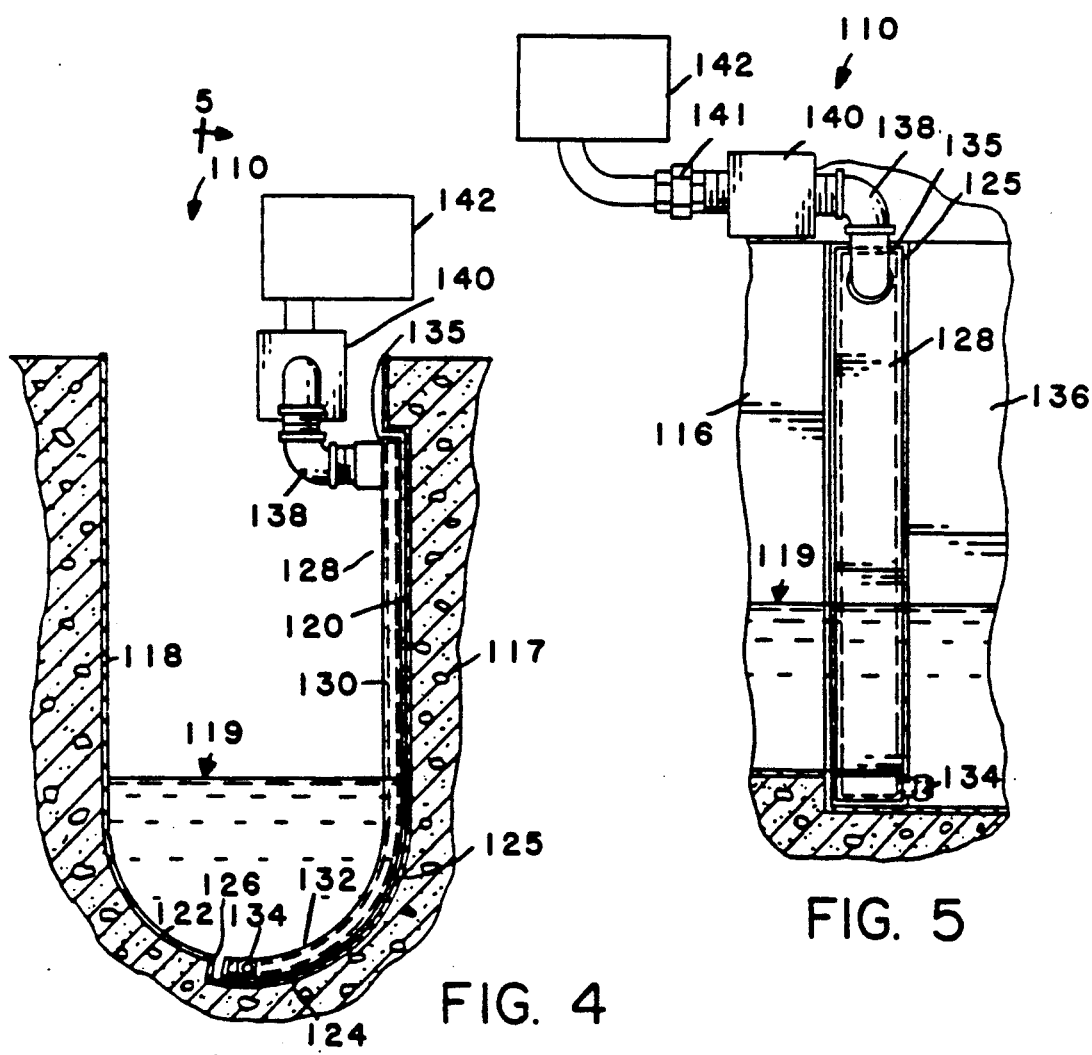

REMOVABLE FLUSHING SYSTEM FOR MACHINE TOOL COOLANT RETURN SYSTEM FLUMES

BACKGROUND OF THE INVENTION

The present invention relates to a flushing system for machine tool coolant return system flumes. Aqueous-based soluble oil coolant is generally provided to a plurality of machining stations to cool the machining stations during operation and to flush machining wastes such as chips, grinding particles and the like from the machining station into the coolant return system flumes where they are transported to a central filter for filtration prior to being disposed of or recirculated to the machining stations. The flumes are generally located beneath the machine tools such that the used coolant may flow directly from the tool into the flumes. The flumes generally have a decreasing elevation toward the filter such that the flow is the result of gravitational force. The flumes are generally U-shaped and embedded in the concrete flooring and include a top grate which allows the coolant to enter the flume while allowing the flumes to be walked over.

As the machining waste contains solid materials, it is preferable to flush the material along the flume toward the filter so that waste material does not build up and a constant flow of coolant and machining waste is maintained. A typical method of assisting the flow of used coolant and waste material is to use flush sufficient to assist in the flow of the coolant toward the filter and prevent the build-up of waste materials in the bottom of the flumes.

One type of nozzle which has been used is disposed above a normal level of the coolant which sprays along the top of the coolant to assist in the movement of the coolant. The problem with such nozzles is that the coolants being provided sometimes splash above the grate, and they also tend to impede the flow of the coolant as the piping connections protrude into the middle of the flume, restricting the flow. These nozzles also only provide additional velocity near the top of the normal coolant level.

Another type of flush nozzle is installed in the bottom of the flume, with the piping connections being external of the flume and being embedded in the concrete of the floor. In this arrangement, the nozzle is submerged beneath a normal level of the coolant and assists in the transportation of the waste material and coolant without additional splashing. These types of nozzles are generally referred to as submersible flush nozzles.

Due to the nature of the waste material involved, the nozzles and piping connections can get clogged and need repair. On such occasions, the system may have to be shut down, and an individual may have to physically go into the trough to clean or repair the nozzle, which is a dirty, time-consuming and difficult job. For the nozzles in which the piping connections are embedded in concrete, the concrete must be dug up to repair these connections if they are broken.

As an additional problem, machine tools are extremely heavy and are not readily moved. If there is a problem with the nozzle underneath the machine tool where a flush nozzle is most needed, as a practical matter, it is virtually impossible to repair.

DISCLOSURE OF INVENTION

The present invention comprises a removable flushing system which is designed to overcome the disadvantages of the prior art systems described above. The present invention provides a flushing system which is readily removable for servicing or replacement. In the preferred embodiment of the present invention, the nozzle is submerged beneath a normal coolant level in the flume and provides coolant for flushing machine waste and coolant to maintain the flow toward the filter. The coolant moves toward the filter primarily by gravity flow, as the flume sections decrease in elevation toward the filter.

In the preferred embodiment of the invention, a lower member is provided between two flume sections which is adapted to receive a flush nozzle assembly. Secured to the exterior of the lower member is a hollow, elongated guide which is gently curved and has an open end located clear of the machine tool for easy access. In connection with the invention, a flexible hose having a flush nozzle assembly secured to one end is inserted into and through the guide where it is securely received in the lower member. The other end of the flexible hose is removably connected to a source of coolant to provide coolant to the flume. In this embodiment, should there be any problems with clogging of the flush nozzle assembly or hose, the hose is readily and easily removed from the open end of the guide which is at a location distant from the machine tool. Once removed, the nozzle may be replaced or easily serviced, and any clogging problems in the hose can be readily remedied. Once the problem is remedied, the flush nozzle assembly end of the hose is reinserted back into the guide and secured in the lower member. As with the prior art where the piping connections were encased in concrete, the guide of the present invention is encased in concrete but does not directly carry coolant to the flume. The coolant is carried to the flume through the removable hose.

In another embodiment of the invention, the flushing system is set into the flume which includes a recess which is adapted to receive it. The recess in the flume allows for a correspondingly shaped supply conduit to fit flushly within the flume without substantially changing the cross-sectional area of the flume. A flush nozzle is secured to the bottom of the supply conduit which supplies coolant to the system. With this embodiment, the entire supply conduit and nozzle are removed by lifting them from the flume. No connections through the flume are required. As such, none of the flushing system is encased in concrete.

The objects and advantages of the present invention will be immediately understood by those skilled in the art, as they solve the problems discussed above.

The invention provides a removable flushing system which provides coolant to machine tool coolant return system flumes. The system is readily removable to provide for ease of servicing and, with the preferred embodiment, may be removed and serviced and reinstalled to provide flushing to the area where it is most greatly required, directly beneath the machine tool.

Other advantages of the system are that it allows for substitution of different types of nozzles to accommodate different types of waste being provided to the coolant return system flume. The present invention eliminates the need for manual labor to clean out backed-up flumes caused by broken or clogged flush nozzles or piping connections and allows for greater ease and access for serviceability and maintenance of the flushing system.

BRIEF DESCRIPTION OF DRAWINGS

FIG. 4 is a sectional elevational view of another embodiment of the invention.

FIG. 5 is a sectional view taken along lines 5—5 of FIG. 4.

FIG. 6 is a partial sectional plan view of the invention of FIG. 4.

DETAILED DESCRIPTION OF THE PREFERRED EMBODIMENTS

Figure 1:
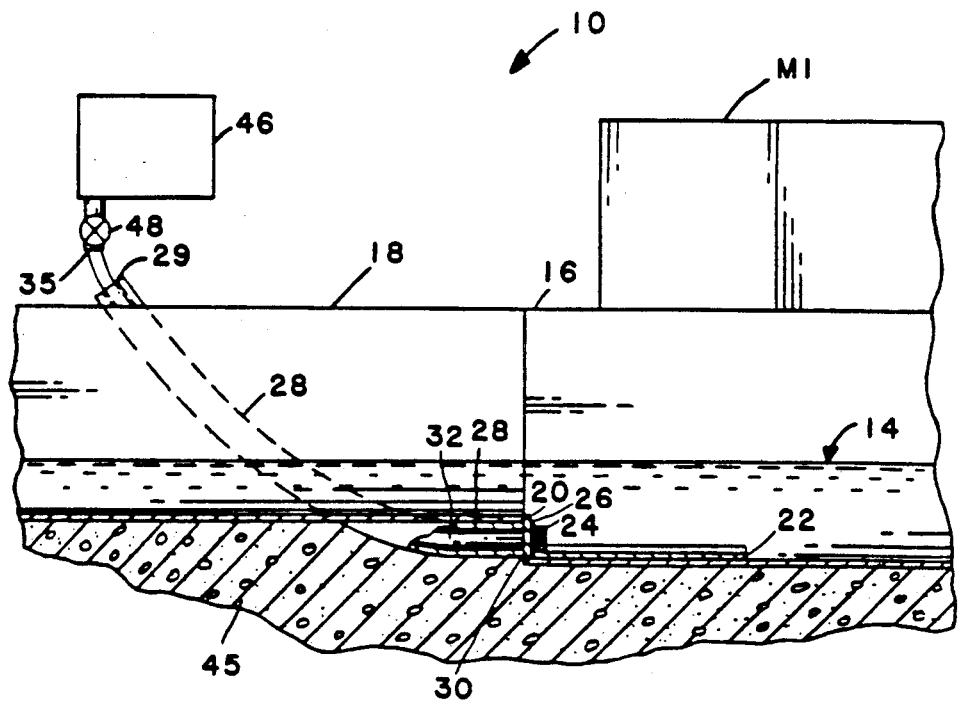
FIG. 1 is a sectional, side elevational view of one embodiment of the invention.
Figure 2:
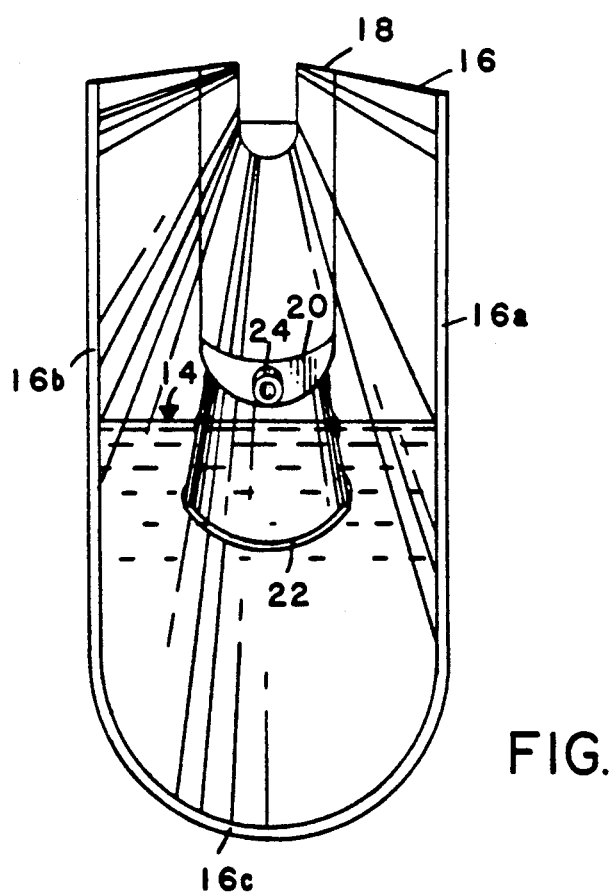
FIG. 2 is a longitudinal view along the inside of a flume according to the invention of FIG. 1.

In the preferred embodiment of the present invention illustrated in FIG. 1 of the drawings, reference numeral 10 refers generally to a removable flushing system which provides coolant to flumes 16 and to flush coolant and machining waste through the flumes to a filter (not shown). The flume sections are designated in FIG. 1 as 16 and 18. A machining station M-1 is shown in FIG. 1 above flume section 16. Machining coolant and waste from the machining station M-1 is collected in the flumes, and the flumes have a normal coolant level 14. Flume sections 16 and 18 are contiguous with each other as shown in FIG. 2. Flume sections 16 and 18 are connected by lower member 20. As can be seen from the drawings of FIGS. 1 and 2, section 16 has a lower elevation than section 18. Reinforcing brace 22 is also included and welded to the bottom of section 16 to provide additional reinforcement for lower member 20 and the connection between flume sections 16 and 18.

As shown in FIG. 2, the flume sections 16 an 18 are U-shaped, and flume 16 includes straight portions 16A and 16B and a lower curved portion 16C.

Figure 3:
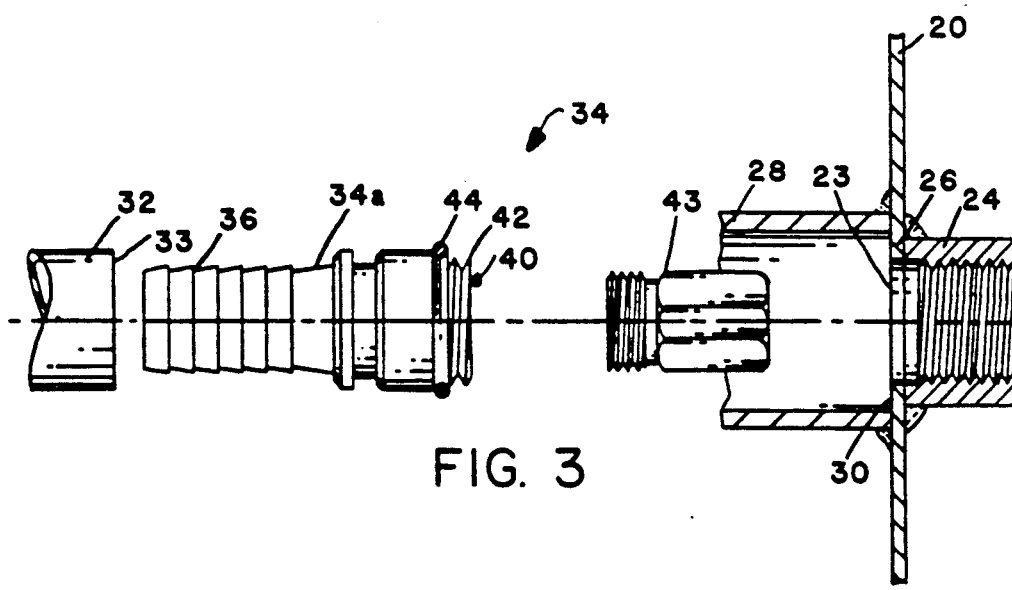
FIG. 3 is an assembly view showing the components of the nozzle assembly according to the invention of FIG. 1.

Lower member 20 includes an opening 23, as shown in FIG. 3, and has a threaded sleeve member 24 welded to an interior face 26 of lower member 20. An elongated guide 28 is secured to an exterior face 30 of lower member 20, as shown in FIG. 3, either by welding or bolting.

A hose 32 is provided and is secured to flush nozzle assembly which is generally designated by 34. Flush nozzle assembly 34 includes member 34a which has circumferential ridges 36 which are inserted into one end 33 of hose 32 and hold the nozzle assembly 34 securely in place in the hose 32. Nozzle assembly 34 further includes an opening 40 having internal threads 41 (not shown) and external threads 42 adapted to receive threaded nozzle tip 43. The entire nozzle assembly 34 is received in lower member 20 by threading the external thread 42 into sleeve 24 as shown in FIG. 3. Nozzle assembly 34 also includes an O-ring 44. As can be seen from FIG. 3, the nozzle tip 43 is threaded into nozzle assembly 34 via internal threads 41, and the nozzle assembly 34 is then inserted into elongated guide 28 and threaded into sleeve 24 by rotation of the hose 32 until it is threaded securely into sleeve 24. The O-ring 44 seals the connection between the nozzle assembly 34 and the lower member 20 so coolant does not leak into the elongated guide 28. In an alternate embodiment, not shown, the nozzle assembly is not threaded into sleeve 24 but includes a snap lock in which the nozzle assembly 34 is snapped into sleeve 24 and removed by pulling on end 35 of the hose 32 to remove it. The snap lock must be of sufficient holding strength that it can resist the back pressure created while the flushing system is in operation.

As can be seen from the drawings, the guide 28 extends underneath and gently curves around section 18 and out alongside of section 18 and up through concrete 45 where the operator has access to it at the open end 29 of elongated guide 28. The guide 28 is preferably gently curved to aid in the insertion and removal of the hose. The guide 28 is encased in concrete 45 when the floor is poured. An end 35 of the hose 32 is then removably connected to coolant supply 46, and the flow of coolant is controlled with valve 48.

When in operation, the machining station M-1 produces machining waste and used coolant which is received in flume sections 16 and 18. The coolant and waste flow toward the filter being aided primarily by gravity. Additional coolant is provided to the flumes 16 and 18 from coolant supply 46 through hose 32 and out of nozzle assembly 34 to assist in moving of the machining waste and coolant toward the filter. Should the nozzle assembly 34 or the hose 32 become clogged, the coolant supply 46 is shut off at valve 48, the end 35 of hose 32 is detached from the valve 48, and the hose 32 is rotated so that external threads 42 are unthreaded from sleeve 24, and the entire hose 32 and nozzle assembly 34 are pulled out through guide 28 for servicing. Once serviced or replaced, the nozzle assembly 34 and hose 32 are reinserted through the guide 28 and secured back in place by rotating the hose so that external threads 42 are threaded into sleeve 24.

The hose 32 is preferably a single braid hydraulic hose. The guide 28 is preferably steel pipe. In one embodiment used by the applicant, schedule 40 steel pipe having an inside diameter of 2 inches and a single braid hydraulic hose having an outside diameter of 1¾ inches and an inside diameter of 1¼ inches were successfully used. Whatever type of hose 32 is used, it must have sufficient strength such that when twisted the necessary torque is applied to the nozzle assembly 34 to securely thread into sleeve 24. It is important that the nozzle assembly 34 be secured properly within sleeve 24, as back pressure created when the flushing system 10 is in use will tend to withdraw the nozzle assembly 34 from sleeve 24. Reinforced hydraulic hose is preferred to resist the hydraulic pressure of the coolant being provided. The length of hose 32 which has been successfully used by the applicant has been up to 30 feet. However, no limitation on the distance of the hose 32 is anticipated, as long as the hose meets the requirements discussed above.

In another embodiment shown in FIGS. 4–6, the flushing system 110 is designed to be received within a recess in flume section 116.

Referring to FIG. 4, an alternative flushing system is generally designated by 110. The flushing system 110 includes flume section 116 which is embedded in concrete 117, and a normal coolant level designated by 119. Flume section 116 includes side walls 118 and 120 and curved lower portions 122 and 124, respectively. Connecting curved portions 122 and 124 is connecting portion 126. As can be seen from FIG. 6, flume section 116 also includes indentations 127 and 129 which are connected by member 131. The flushing system 110 includes a supply conduit 128 which is adapted to be flushly received within a curved channel 125 created by indentations 127 and 129 and connecting member 131. The supply conduit 128 has a straight portion 130 and a curved portion 132. The lower end of curved portion 132 includes a removable flush nozzle 134. As can be seen from the drawings of FIG. 4 and FIG. 5, the supply conduit 128 is of a dimension and size to fit flushly within the curved channel 125 such that the cross-sectional area of flume section 116 is not substantially changed by the inclusion of the flushing system. Immediately downstream of flume section 116 is flume section 136 which is at approximately the same elevation as the lower curved portion 124. The connecting of the flume sections along the lower elevation allows for a smooth transition of flume sections to assist in the transport of machining waste to the filter to prevent build-up of machining waste at the joining of the flume sections.

At an upper end 135 of the supply conduit 128 are detachable piping connections 138 and valve 140. Piping connections 141 are provided to removably attach the flushing system to coolant supply 142. Valve 140 controls the flow of coolant from the coolant supply 142 into the supply conduit 128 and into the nozzle 134. For servicing, valve 140 is closed, and piping connections 138 are detached, and the flushing system 110 is removed from the flume 116 for servicing. Once repaired, the flushing system 110 may be readily replaced by setting it back in place and reconnecting piping connections 138. The flushing system of this embodiment is held in place by its own weight and the piping connections, but may be optionally secured in place with brackets (not shown)

With both embodiments, the nozzles may be changed depending on the type of machining waste involved to insure that the machining waste is properly moved along the flumes toward the filter. Furthermore, if the systems cannot be repaired, they can be readily replaced.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise and as specifically described.

The embodiments of the invention in which an exclusive property or privilege is claimed are defined as follows:

1. In a coolant return system for transporting machine tool coolant, a removable flushing system comprising:
   a flume for transporting the machine tool coolant;
   said flume having a lower member adapted to receive a flush nozzle,
   a hollow elongated guide having first and second ends, said first end being secured to the lower member;
   a removable flexible hose having first and second ends;
   a flush nozzle secured to the first end of the hose;
   a separate source of machine tool coolant in communication with the second end of the hose to provide machine tool coolant for the flume;
   and a connector for securing the flush nozzle to the lower member with the hose extending through the guide to provide machine tool coolant from the separate source to the machine tool coolant transported in the flume.

2. Apparatus as set forth in claim 1 wherein the flush nozzle is submerged beneath a normal coolant level of the flume.

3. Apparatus as set forth in claim 1 wherein the elongated guide is a tube having its second end accessibly located for access to insert and remove the hose.

4. Apparatus as set forth in claim 1 wherein the lower member includes a snap lock to receivably secure the flush nozzle thereto.

5. Apparatus as set forth in claim 1 wherein the lower member and flush nozzle include mating screw threads, and wherein the flush nozzle is receivably secured to the lower member by being threaded into the lower member.

6. Apparatus as set forth in claim 5 wherein the flush nozzle includes an elastomeric O-ring connection to prevent leakage from the flume into the guide.

7. Apparatus as set forth in claim 5 including a threaded member welded to the lower member.

8. Apparatus as set forth in claim 5 wherein the flush nozzle includes a threaded member adapted to receive a spray nozzle tip.

9. Apparatus as set forth in claim 1 wherein the tube is a single braid hydraulic hose.

10. Apparatus as set forth in claim 1 wherein the elongated guide is a steel pipe.

11. Apparatus as set forth in claim 1 wherein the flume further includes an upper upstream and lower downstream elevation connected by the lower member.

12. In a coolant return system for transporting machine tool coolant, a removable flushing system comprising:
    a flume for carrying coolant, said flume including at least one side wall;
    a removable supply conduit;
    a recess in at least one side wall adapted to receive the removable supply conduit;
    a removable nozzle secured to said supply conduit; and
    a source of coolant in connection with said supply conduit to provide coolant to the flume.

13. Apparatus as set forth in claim 12 wherein the nozzle is submerged beneath a normal coolant level of the flume.

14. Apparatus as set forth in claim 12 wherein the flume is U-shaped and includes a lower curved member and opposed side walls.

15. Apparatus as set forth in claim 14 wherein the supply conduit includes an upper vertical portion and a lower curved end.

16. Apparatus as set forth in claim 15 wherein the nozzle is located at the lower curved end of the supply conduit.

17. Apparatus as set forth in claim 12 wherein the supply conduit is received within the recess.

18. In a coolant return system for transporting machine tool coolant, a removable flushing system comprising:
    a flume for transporting machine tool coolant;
    said flume including an upper upstream member and lower downstream elevation connected by a lower member adapted to receive a flush nozzle assembly;
    a flexible hose having first and second ends;
    a flush nozzle secured to the first end of the hose;

said lower member and flush nozzle including mating screw threads;

a separate source of machine tool coolant in communication with the second end of the hose; and a connector for securing the flush nozzle to the lower member with the hose extending through the guide effected by threading the flush nozzle into the lower member where it is submerged.

19. In a coolant return system for transporting machine tool coolant, a removable flushing system comprising:

a flume for carrying coolant, said flume including at least one side wall;

a removable supply conduit;

a recess in at least one side wall adapted to receive the supply conduit;

said supply conduit including an upper vertical portion and a lower curved end;

a nozzle secured to said supply conduit at its lower curved end;

said nozzle being submerged beneath a normal coolant level of the flume; and a source of coolant in communication with said supply conduit to provide coolant to the flume.

* * * * *